(12) United States Patent
Kusakabe

(10) Patent No.: US 12,110,654 B2
(45) Date of Patent: Oct. 8, 2024

(54) EXCAVATION DATA PROCESSING METHOD, EXCAVATION DATA PROCESSING DEVICE, AND EXCAVATOR FOR TRENCH

(71) Applicant: KOBELCO CONSTRUCTION MACHINERY CO., LTD., Hiroshima (JP)

(72) Inventor: Keisuke Kusakabe, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 1075 days.

(21) Appl. No.: 16/920,851

(22) Filed: Jul. 6, 2020

(65) Prior Publication Data

US 2021/0010231 A1    Jan. 14, 2021

(30) Foreign Application Priority Data

Jul. 8, 2019   (JP) .................. 2019-126590

(51) Int. Cl.
| | |
|---|---|
| E02F 5/00 | (2006.01) |
| E02F 5/06 | (2006.01) |
| E02F 5/14 | (2006.01) |
| G01B 7/28 | (2006.01) |
| G01C 9/02 | (2006.01) |

(52) U.S. Cl.
CPC .............. *E02F 5/145* (2013.01); *E02F 5/06* (2013.01); *G01B 7/28* (2013.01); *G01C 9/02* (2013.01)

(58) Field of Classification Search
CPC .. E02F 5/145; E02F 5/06; E02F 9/264; G01B 7/28; G01B 21/20; G01C 9/02; G01C 7/06

USPC ........................................................ 701/34.2
See application file for complete search history.

(56) References Cited

U.S. PATENT DOCUMENTS

| | | | | |
|---|---|---|---|---|
| 2001/0049891 | A1* | 12/2001 | Mizutani ................. | E02F 9/26 37/352 |
| 2004/0148818 | A1* | 8/2004 | Kinoshita ................ | E02F 5/06 37/348 |
| 2020/0032483 | A1* | 1/2020 | Ready-Campbell ....... | G05D 1/0274 |
| 2020/0329631 | A1* | 10/2020 | Johnson ................. | A01C 7/205 |

FOREIGN PATENT DOCUMENTS

JP    2001-348906 A    12/2001

* cited by examiner

*Primary Examiner* — Tiffany P Young
(74) *Attorney, Agent, or Firm* — Oblon, McClelland, Maier & Neustadt, L.L.P.

(57) ABSTRACT

An excavation data processing method includes: a first acquisition step of acquiring position data of a reference part of an excavating body, position data of a plurality of measuring parts with respect to the reference part in the excavating body, and data indicative of an excavation depth; a second acquisition step of acquiring inclination angle data of the plurality of measuring parts of the excavating body; a first deriving step of deriving a plurality of measurement positions as positions of the plurality of measuring parts from the reference part position data, the plurality of measuring part positions data and inclination angles data; a second deriving step of deriving an excavation bottom position by interpolation processing based on the plurality of measurement positions and the excavation depth; and an output step of outputting information of the excavation bottom position.

1 Claim, 9 Drawing Sheets

EXCAVATION DATA PROCESSING METHOD, EXCAVATION DATA PROCESSING DEVICE, AND EXCAVATOR FOR TRENCH

INCORPORATION BY REFERENCE

The present application claims priority from Japanese Patent Application No. 2019-126590 filed on Jul. 8, 2019, disclosure of which is all incorporated herein.

BACKGROUND

The present invention relates to an excavation data processing method of deriving a value related to a shape of a trench in a case where the trench is excavated by moving an excavating body having an excavating chain in a vertical direction and a lateral direction, and to an excavation data processing device and an excavator for a trench.

Among soil cement underground continuous wall construction methods, a TRD (Trench Cutting Re-mixing Deep Wall Method) is known. An excavator for a trench for use in the TRD is provided with an excavating body having a vertically long post portion and an endless excavating chain which rotates along a periphery of the post portion.

The excavator for a trench excavates a trench by moving, in a lateral direction, the excavating body being partly buried underground. Further, the excavator for a trench creates a wall by stirring and mixing soil and a solidifying liquid in the trench. Thus created wall is a temporary wall which prevents a landslide in a process of work, such as an earth retaining wall, or a permanent wall. The permanent wall is a wall of a construction itself. The earth retaining wall is referred to as a land slide protection wall or a land slide protection in some cases.

Also, there is a known technique, as recited in Japanese Unexamined Patent Publication No. 2001-348906, in which a calculator in the excavator for a trench accumulates data of a detection result of one or more clinometers embedded in the excavating body and data of a moving distance in the lateral direction of the excavating body, and a monitor displays the accumulated data.

Meanwhile, the trench is formed from the ground surface down to a position deeper than a depth of an underground excavation bottom. Then, after the wall in which filling the trench is created and before a building is constructed, a part of the land on one side of the wall is excavated down to the depth of the excavation bottom.

Then, when the building is constructed, a shape of the wall at a position of the depth of the excavation bottom is in particular essential. Here, a shape of the wall is substantially the same as the shape of the trench. However, in the excavator for a trench, the clinometer in the excavating body is not always arranged at a position of the depth of the excavation bottom.

On the other hand, in such conventional excavation data processing as described above, a shape value of the trench at a position where the clinometer is arranged is calculated. Therefore, in a case where the clinometer is not arranged at the position of the depth of the excavation bottom, a shape value of the most essential part of the trench is not calculated in the conventional excavation data processing.

SUMMARY

An object of the present invention is to provide an excavation data processing method which enables derivation of a shape value of a trench at a position of a depth of an excavation bottom in a case where the trench is excavated by the TRD, irrespective of a position of a part of an excavating body where an inclination angle is detected, and an excavation data processing device and an excavator for a trench therefor.

The present invention provides an excavation data processing method. The excavation data processing method is for acquiring data output from an excavator for a trench that, while excavating a trench underground by moving, in a lateral direction, an excavating body being partly buried underground, forms a wall underground corresponding to the trench, the excavating body having a vertically long post portion extending in an up-down direction and having an endless excavating chain supported by the post portion so as to surround the post portion in the up-down direction and the lateral direction and rotating along a periphery of the post portion, and for deriving information related to a shape of the trench in order to excavate a part adjacent to one wall surface of the wall extending in the lateral direction, down to a predetermined excavation bottom positioned between an upper end portion and a lower end portion of the wall.

The excavation data processing method includes: a first acquisition step of acquiring reference part position data as data related to a relative position of a reference part of the excavating body with respect to an origin on the ground surface, the reference part being arranged above the ground; data of a plurality of measuring part positions as data related to a relative position of each of a plurality of measuring parts in the excavating body with respect to the reference part, the plurality of measuring parts being arranged underground at a space from each other in the up-down direction; and data indicative of an excavation depth as a depth from the ground surface to the excavation bottom underground; a second acquisition step of acquiring data of a plurality of inclination angle as data of an inclination angle of each of the plurality of measuring parts, the data being output from the excavator for a trench; a first deriving step of deriving a plurality of measurement positions as relative positions of the plurality of measuring parts with respect to the origin from the reference part position data and the plurality of measuring part positions data acquired in the first acquisition step and the plurality of inclination angles data acquired in the second acquisition step; a second deriving step of deriving an excavation bottom position as a relative position of a part of the excavating body with respect to the origin, the part intersecting a horizontal plane below the ground surface by the excavation depth, by interpolation processing based on the plurality of measurement positions derived in the first deriving step and the excavation depth acquired in the first acquisition step; and an output step of outputting information of the excavation bottom position.

The present invention also provides an excavation data processing device. The excavation data processing device acquires data output from an excavator for a trench that, while excavating a trench underground by moving, in a lateral direction, an excavating body being partly buried underground, forms a wall underground corresponding to the trench, the excavating body having a vertically long post portion extending in an up-down direction and having an endless excavating chain supported by the post portion so as to surround the post portion in the up-down direction and the lateral direction and rotating along a periphery of the post portion, and derives information related to a shape of the trench in order to excavate a part adjacent to one wall surface of the wall extending in the lateral direction, down to a predetermined excavation bottom positioned between an upper end portion and a lower end portion of the wall. The excavation data processing device includes: a first acquisition portion which acquires reference part position data as data related to a relative position of a reference part of the excavating body with respect to an origin on the ground surface, the reference part being arranged above the ground; data of a plurality of measuring part positions as data related to a relative position of each of a plurality of measuring parts in the excavating body with respect to the reference part, the plurality of measuring parts being arranged underground at a space from each other in the up-down direction; and data indicative of an excavation depth as a depth from the ground surface to the excavation bottom underground; a second acquisition portion which acquires data of a plurality of inclination angles as data of an inclination angle of each of the plurality of measuring parts, the data being output from the excavator for a trench; a first deriving portion which derives a plurality of measurement positions as relative positions of the plurality of measuring parts with respect to the origin from the reference part position data and the plurality of measuring part positions data acquired by the first acquisition portion and the plurality of inclination angles data acquired by the second acquisition portion; a second deriving portion which derives an excavation bottom position as a relative position of a part of the excavating body with respect to the origin, the part intersecting a horizontal plane below the ground surface by the excavation depth, by interpolation processing based on the plurality of measurement positions derived by the first deriving portion and the excavation depth acquired by the first acquisition portion; and an output portion which outputs information of the excavation bottom position.

The present invention further provides an excavator for a trench. The excavator for a trench includes: an excavating body having a vertically long post portion extending in an up-down direction and having an endless excavating chain supported by the post portion so as to surround the post portion in the up-down direction and a lateral direction and rotating along a periphery of the post portion; an inclination angle detection device which detects and outputs an inclination angle of each of a plurality of measuring parts arranged at a space from each other in the up-down direction in the excavating body; and the above-described excavation data processing device. While moving in the lateral direction to excavate a trench underground, the excavating body being partly buried underground forms a wall underground corresponding to the trench, and the excavation data processing device acquires data of the plurality of inclination angle detection values from the inclination angle detection device to derive information related to a shape of the trench.

DETAILED DESCRIPTION

An embodiment of the present invention will be described with reference to the drawings in the following. The embodiment below is one example only of the present invention implemented and does not limit a technical range of the present invention.

Figure 1:
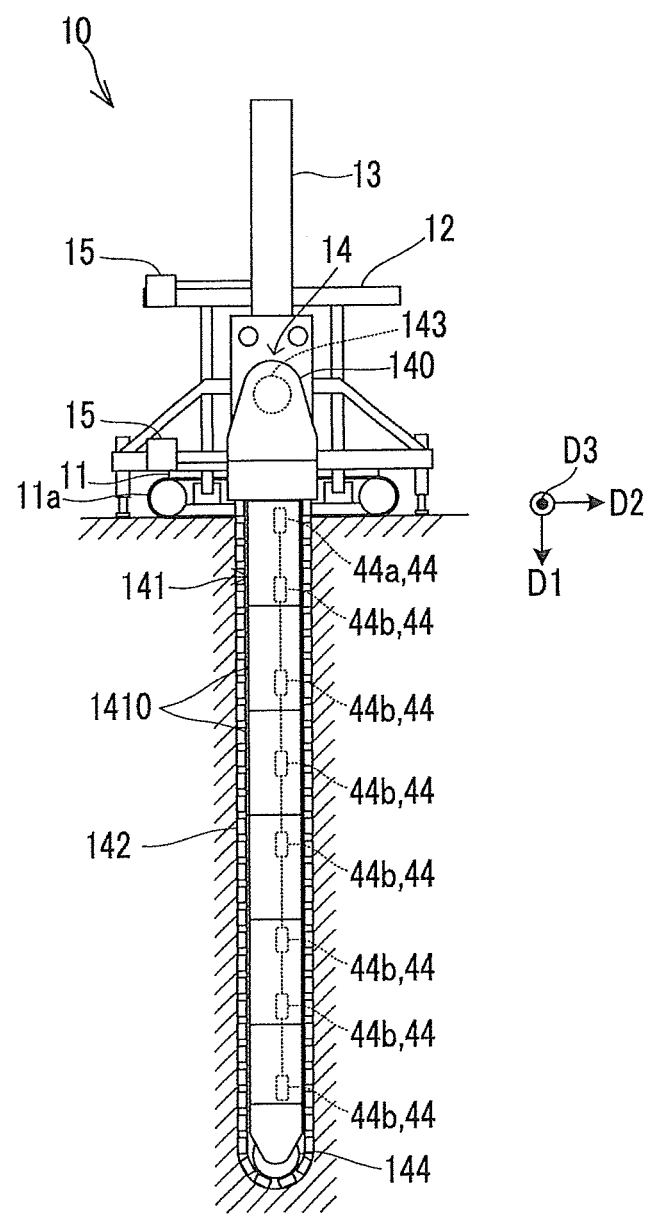
FIG. 1 is a front view of an excavator for a trench according to a first embodiment of the present invention.
Figure 2:
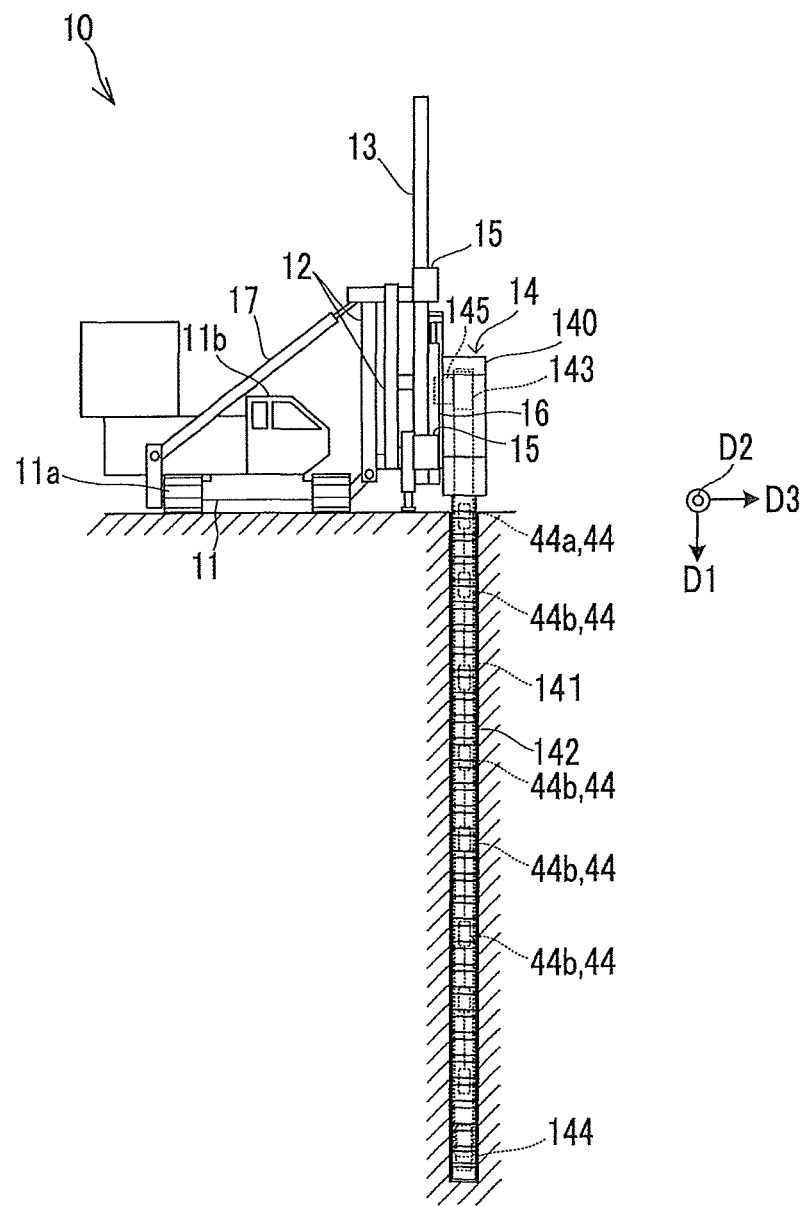
FIG. 2 is a side view of the excavator for a trench according to the first embodiment of the present invention.

First, with reference to FIGS. 1 and 2, a mechanical configuration of an excavator for a trench 10 according to a first embodiment of the present invention will be described. FIG. 1 is a front view of the excavator for a trench 10 according to the present embodiment and FIG. 2 is a side view of the excavator for a trench. The excavator for a trench 10 is a working machine for use in the TRD which is one of the soil cement underground continuous wall construction methods.

Specifically, the excavator for a trench 10 excavates a trench forming an outer shape of a wall. The wall is, for example, an earth retaining wall or a permanent wall. Further, the excavator for a trench 10 creates the wall by stirring and mixing soil and a solidifying liquid in the trench excavated.

As shown in FIG. 1, the excavator for a trench 10 includes a main body portion 11, a portal frame 12, a leader 13, an excavating body 14, a slide actuator 15, an elevating actuator 16, a stay actuator 17, and the like.

Further, the excavator for a trench 10 also includes a travelling device 11*a* and a cab 11*b* linked to the main body portion 11. The travelling device 11*a* travels on the ground surface to cause the main body portion 11 to move along the ground surface.

The portal frame 12 is turnably supported by the main body portion 11. The stay actuator 17 links the main body portion 11 and the portal frame 12 and adjusts an angle of the portal frame 12 with respect to a vertical direction.

The leader 13 is supported by the portal frame 12 so as to be slidable in a lateral direction. The slide actuator 15 causes the leader 13 to move in the lateral direction.

The excavating body 14 includes an excavation base portion 140, a cutter post 141, an excavating chain 142, a drive sprocket 143, a driven sprocket 144, a chain drive motor 145, and the like.

The excavation base portion 140 is supported by the leader 13 so as to be movable in an up-down direction. The elevating actuator 16 causes the excavation base portion 140 to move in the up-down direction. The excavation base portion 140 contains the drive sprocket 143 and the chain drive motor 145. The drive sprocket 143 is rotatably supported by the excavation base portion 140.

The cutter post 141 is linked with a lower portion of the excavation base portion 140 and is formed to be vertically long so as to extend in the up-down direction. The cutter post 141 is configured with a plurality of unit posts 1410 linked in the vertical direction. The driven sprocket 144 is rotatably supported by a lower end portion of the cutter post 141. The cutter post 141 is one example of a post portion supporting the endless excavating chain 142.

The endless excavating chain 142 is stretched between the drive sprocket 143 and the driven sprocket 144. By driving the drive sprocket 143 to rotate by the chain drive motor 145, the excavating chain 142 is supported by the cutter post 141 so as to surround the cutter post 141 in the up-down direction and the lateral direction and rotates along a periphery of the cutter post 141.

While the chain drive motor 145 causes the excavating chain 142 to rotate, the elevating actuator 16 causes the excavating body 14 to move in a first direction D1 heading downward, so that the excavating body 14 excavates an underground pit which becomes an end portion of the trench.

The first direction D1 is a depth direction of the trench, i.e. a depth direction of the wall. In the example shown in FIGS. 1 and 2, the first direction D1 is a vertically downward direction. The first direction D1 may be an obliquely downward direction which forms a predetermined angle with respect to the vertical direction in some cases. The stay actuator 17 adjusts an angle of the excavating body 14 so that a longitudinal direction of the excavating body 14 goes along the first direction D1.

Further, with the cutter post 141 of the excavating body 14 being inserted into the pit, while the chain drive motor 145 causes the excavating chain 142 to rotate, the slide actuator 15 causes the excavating body 14 to move in a second direction D2 orthogonal to the first direction D1.

The second direction D2 is a length direction of the trench, i.e., a length direction of the wall, and is a horizontal direction. A lateral moving direction of the excavating body 14 caused by the slide actuator 15 includes the second direction D2 and a direction oppopart to the second direction D2.

When the excavating body 14 reaches an end point of a movable range in the lateral direction, the slide actuator 15 causes the excavating body 14 to move so as to return to a start point of the movable range in the lateral direction. Further, the travelling device 11a causes the excavator for a trench 10 including the excavating body 14 as a whole to move in the second direction D2.

Movement of the excavating body 14 in the second direction D2 caused by the slide actuator 15 or the travelling device 11a will be repeated until the excavating body 14 moves from a leading edge position to a terminal edge position of the trench in the second direction D2.

Specifically, the excavator for a trench 10 excavates the trench forming the outer shape of the wall by causing the excavating body 14 to move from the ground surface in the first direction D1 (the downward direction) and further causes the excavating body 14 to move in the second direction D2 (the lateral direction) while causing the excavating chain 142 to rotate.

A third direction D3 shown in FIGS. 1 and 2 is a horizontal direction orthogonal to the second direction D2. The third direction D3 is a direction heading from the main body portion 11 side toward a side oppopart to the main body portion 11 with respect to the excavating body 14.

While causing the excavating chain 142 to rotate, the excavator for a trench 10 discharges a solidifying liquid from the cutter post 141. This makes the excavating chain 142 stir and mix soil and the solidifying liquid in the trench. As a result, the wall having the shape of the trench as an outer shape is formed underground.

[Configuration of Data Processing Related Apparatus of Excavator for Trench 10]

Figure 3:
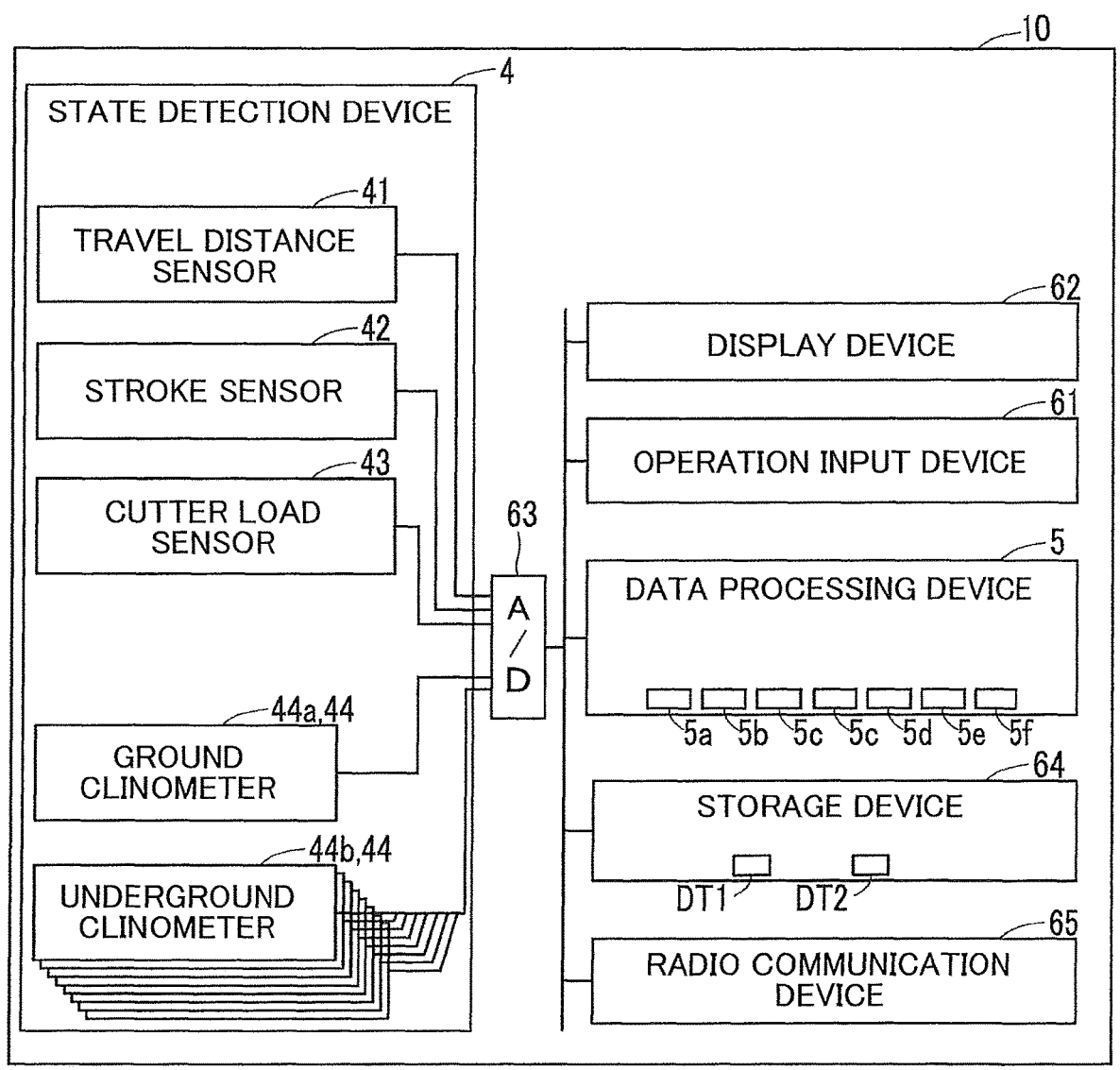
FIG. 3 is a block diagram showing a configuration of a data processing related apparatus in the excavator for a trench according to the first embodiment of the present invention.

Further, FIG. 3 is a block diagram showing a configuration of a data processing related apparatus in the excavator for a trench 10 according to the present embodiment. As shown in FIG. 3, the excavator for a trench 10 is provided with a state detection device 4, a data processing device 5, and peripheral devices of the data processing device 5. The peripheral devices include an operation input device 61, a display device 62, an AD conversion device 63, a storage device 64, a radio communication device 65, and the like.

For example, the data processing device 5, the operation input device 61, the display device 62, and the storage device 64 are arranged in the cab 11b.

The state detection device 4 detects various kinds of states of the excavator for a trench 10. Specifically, the state detection device 4 includes a travel distance sensor 41, a stroke sensor 42, a cutter load sensor 43, a plurality of clinometers 44, and the like. A detection signal output from the state detection device 4 is converted into digital data by the AD conversion device 63 and the converted data is transmitted to the data processing device 5.

The travel distance sensor 41 measures a moving distance, in the second direction D2, of the excavator for a trench 10 which travels by the operation of the travelling device 11a. The AD conversion device 63 converts a detection signal of the travel distance sensor 41 into data of a travel distance detection value and outputs the data of the travel distance detection value to the data processing device 5.

The stroke sensor 42 measures a moving distance, in the second direction D2, of the excavating body 14 which moves by the operation of the slide actuator 15. The AD conversion device 63 converts a detection signal of the stroke sensor 42 into data of a lateral slide distance detection value and outputs the data of the lateral slide distance detection value to the data processing device 5.

A total of the travel distance detection value and the lateral slide distance detection value is a moving distance of the excavating body 14 in the second direction D2. Each of the data of the travel distance detection value and the data of the lateral slide distance detection value is one example of data indicative of a moving distance of the excavating body 14 in the second direction D2.

The cutter load sensor 43 detects a load to be applied to the chain drive motor 145, i.e., a load to be applied to the excavating chain 142. For example, a load detected by the cutter load sensor 43 is used as an index of a solidification condition of the solidifying liquid when operation of the excavating chain 142 which stirs the solidifying liquid is controlled.

The plurality of clinometers 44 is arranged at different positions in the cutter post 141. The plurality of clinometers 44 detects an inclination angle of each of a plurality of longitudinal measuring parts of the excavating body 14 with respect to a reference direction.

In the description below, an angle detected by each clinometer 44 is an angle of inclination of each measuring part with respect to a vertical line (a reference direction) when each measuring part is viewed from the second direction D2. In other words, an inclination angle detected by each clinometer 44 is an angle of inclination in the third direction D3 of each measuring part with respect to the vertical line. In a case where the first direction D1 is the obliquely downward direction which forms a predetermined angle with respect to the vertical direction as described above, an inclination angle detected by each clinometer 44 corresponds to an inclination angle of the measuring part with respect to the first direction D1.

The plurality of clinometers 44 includes one ground clinometer 44a and a plurality of underground clinometers 44b. The ground clinometer 44a is arranged at a part positioned above the ground surface among the plurality of measuring parts. The plurality of underground clinometers 44b is arranged at a plurality of parts positioned underground among the plurality of measuring parts.

The AD conversion device 63 converts a detection signal of the plurality of clinometers 44 into data of a plurality of inclination angle detection values and outputs the data of the plurality of inclination angle detection values to the data processing device 5. Each of the plurality of clinometers 44 and the AD conversion device 63 is one example of an inclination angle detection device.

The operation input device 61 is a device which inputs information according to person's operation and includes, for example, a keyboard, a touch panel, or the like. The display device 62 is a device which displays information, and is, for example, a panel display device such as a liquid display panel.

The storage device 64 is a nonvolatile storage device which stores various kinds of data to be referred to or recorded by the data processing device 5. For example, an SSD (Solid State Drive) or a hard disk drive is adopted as the storage device 64.

The radio communication device 65 is a communication interface device which communicates with a management device not shown through a radio communication network. The data processing device 5 is communicable with the management device connected to the Internet through the radio communication device 65.

Figure 4:
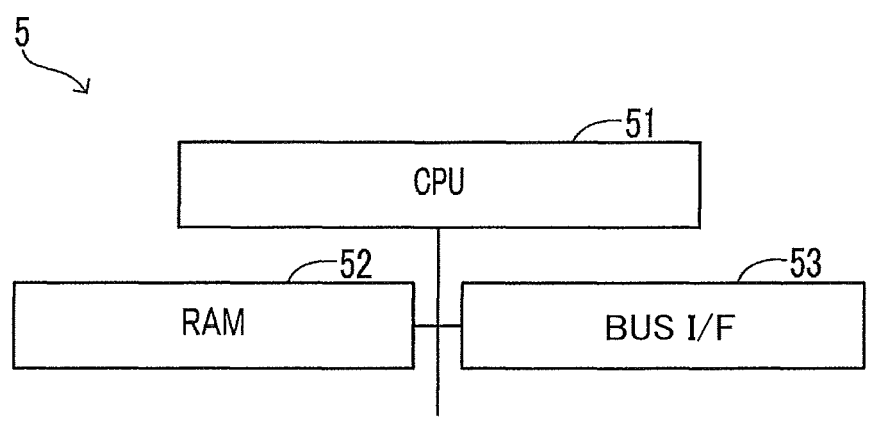
FIG. 4 is a block diagram showing a configuration of an excavation data processing device in the excavator for a trench according to the first embodiment of the present invention.

FIG. 4 is a block diagram showing a configuration of the data processing device 5 (an excavation data processing device) in the excavator for a trench 10 according to the present embodiment. As shown in FIG. 4, the data processing device 5 is provided with a CPU (Central Processing Unit) 51, a RAM (Random Access Memory) 52, a bus interface 53, and the like. The CPU 51 is a processor which executes various kinds of data processing by executing a computer program stored in the storage device 64.

The RAM 52 is a volatile memory which primarily stores the computer program to be executed by the CPU 51 and data to be referred to or recorded by the CPU 51.

The bus interface 53 is an interface device which relays data transmission and reception between the CPU 51 and the operation input device 61, the display device 62, the storage device 64, and the radio communication device 65 through buses.

The data processing device 5 acquires data of a plurality of detection values output from the state detection device 4 of the excavator for a trench 10 and derives a value (information) related to the shape of the trench from each detection value. The data processing device 5 is one example of an excavation data processing device. The plurality of detection values includes the travel distance detection value, the lateral slide distance detection value, and the inclination angle detection values of the plurality of measuring parts.

Meanwhile, the trench is formed from the ground surface down to a position deeper than a depth of an underground excavation bottom. Then, after the wall filling the trench is created and before a building is constructed, a part of the land on one side of the wall is excavated down to the depth of the excavation bottom. In other words, the excavation bottom here is not a bottom of a trench formed by an excavator for a trench but a bottom portion of a trench excavated later adjacent to the wall formed by the excavator for a trench. The bottom portion in many cases becomes a foundation part of a building. An excavation bottom is set below an upper end portion of a trench (wall) formed by an excavator for a trench, i.e., is set below the ground surface and above a lower end portion of the trench (wall) formed by the excavator for a trench.

Then, when the building is constructed, a shape of the trench at a position of the depth of the excavation bottom is in particular essential. Here, a shape of the wall is substantially the same as the shape of the trench. However, in the excavator for a trench 10, the plurality of clinometers 44 in the excavating body 14 is not always arranged at a position of the depth of the excavation bottom.

On the other hand, in conventional excavation data processing, a shape value of the trench at a position where the plurality of clinometers 44 is arranged is calculated. Therefore, in a case where the clinometer 44 is not arranged at the position of the depth of the excavation bottom, a shape value of the most essential part of the trench is not calculated in the conventional excavation data processing.

In the excavator for a trench 10 according to the present embodiment, the data processing device 5 executes excavation data processing to be described later (see FIG. 5). This enables the data processing device 5 to derive a shape value of the trench at the position of the depth of the excavation bottom irrespective of a position of the plurality of measuring parts at which an inclination angle is detected in the excavating body 14.

[Excavation Data Processing]

Figure 5:
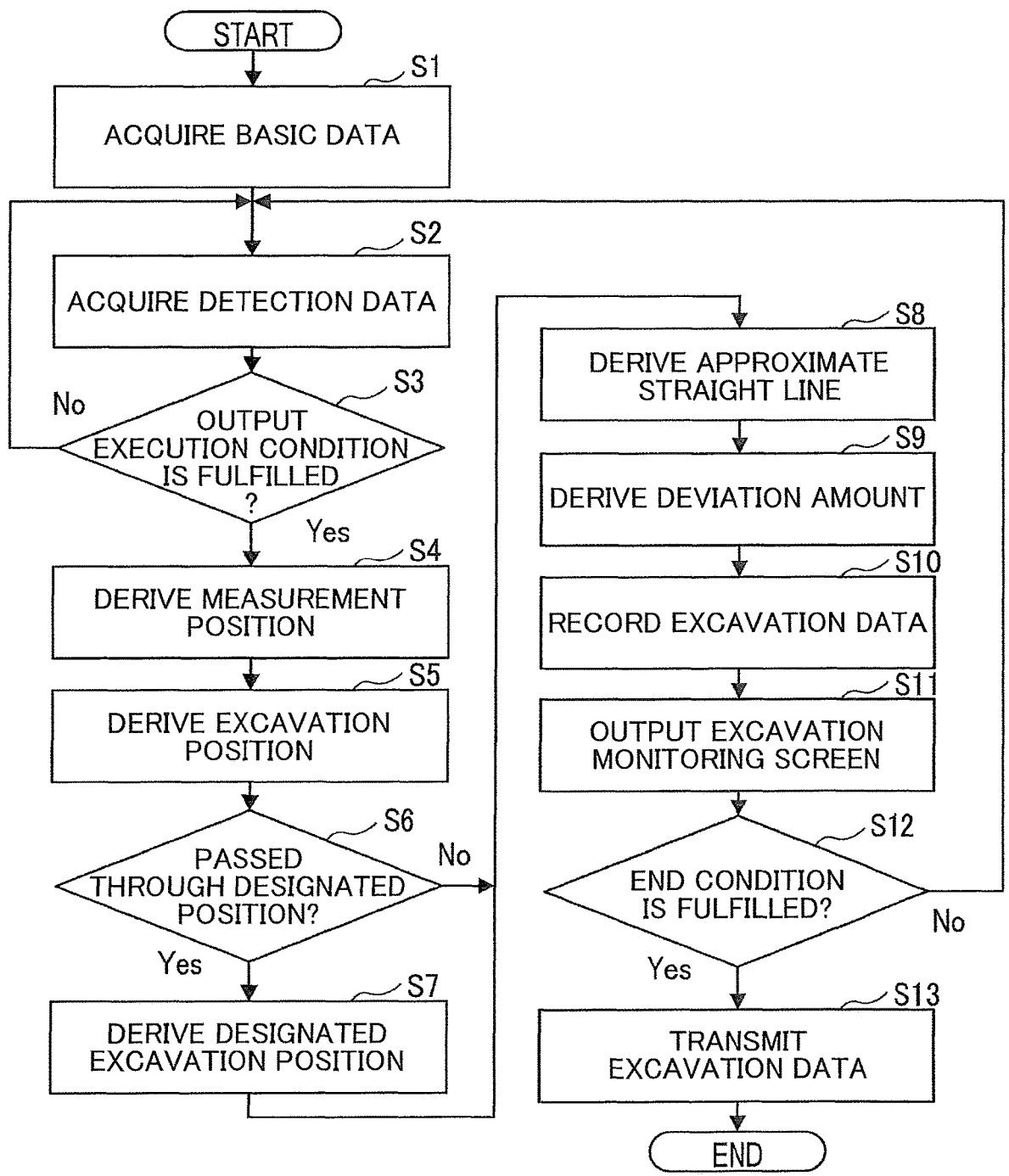
FIG. 5 is a flow chart showing one example of a procedure of excavation data processing executed in the excavator for a trench according to the first embodiment of the present invention.

FIG. 5 is a flow chart showing one example of a procedure of excavation data processing executed in the excavator for a trench 10 according to the present embodiment. In the following, with reference to the flow chart shown in FIG. 5, description will be made of one example of a procedure of the excavation data processing executed by the data processing device 5. Execution of the excavation data processing realizes an excavation data processing method according to the present invention.

The data processing device 5 includes a plurality of processing modules realized by the execution of the computer program by the CPU 51. The plurality of processing modules executes the excavation data processing. The plurality of processing modules includes a main control portion 5a, a data acquiring portion 5b, a measurement position deriving portion 5c, an interpolation processing portion 5d, a gap deriving portion 5e, and an output portion 5f (also referred to as a data input portion) (see FIG. 3).

For example, when predetermined start operation is conducted with respect to the operation input device 61, the main control portion 5a causes the excavation data processing to start. When the excavating body 14 starts moving in the second direction D2 after the excavator for a trench 10 finishes with excavation of a hole in the first direction D1 at a point where excavation of the trench is started, the start operation is conducted.

In the following description, S1, S2 . . . represent identification codes indicative of a plurality of steps in the excavation data processing.

<Step S1>

First, in Step S1, the data acquiring portion 5b acquires basic data DT1 through the operation input device 61 or from the storage device 64. FIG. 3 shows an example in which the basic data DT1 is stored in the storage device 64 in advance.

The basic data DT1 includes data of a position of a ground clinometer, data of a position of a plurality of underground clinometers, data of a wall thickness, data of an excavation depth, and data of one or more designated positions.

The wall thickness is a thickness of the wall formed underground and is also a thickness of the trench. The wall thickness corresponds to a thickness of a part of the excavating body 14 which enters the underground.

The position of the ground clinometer is represented by a distance from an intersection between the excavating body 14 and the ground surface to the ground clinometer 44a at a point where excavation of the trench is started, in other words, before the excavator for a trench 10 starts travelling. In the present embodiment, the intersection between the excavating body 14 and the ground surface is an origin on the ground surface as a reference for various kinds of positions.

Accordingly, assuming that a detected angle of the ground clinometer 44a is defined as φa and a value of a position of the ground clinometer is defined as La, a coordinate Ya in the third direction D3 and a coordinate Za in the vertical direction at the position of the ground clinometer 44a on the basis of the origin are respectively represented by Formula (1) below.

[Formula 1]

$$Ya = -La \cdot \sin(\varphi a)$$

$$Za = +La \cdot \cos(\varphi a) \quad (1)$$

In the present embodiment, a part at which the ground clinometer 44a is arranged in the excavating body 14 is a reference part. The data of a position of the ground clinometer is one example of data (reference part position data) indicative of a relative position of the reference part with respect to the origin. The part at which the ground clinometer 44a is arranged in the excavating body 14 is also one of the plurality of measuring parts. The reference part position data may be absolute position data.

A position of the plurality of underground clinometers is represented by a distance from the ground clinometer 44a to each of the plurality of underground clinometers 44b. Data of a position of the plurality of underground clinometers is one example of data (data of the plurality of measuring part positions) indicative of a relative position of the plurality of measuring parts with respect to the reference part. The data of the plurality of measuring part positions may be absolute position data.

Assuming that a detected angle of the underground clinometer 44b is defined as φb and a value of a position of the underground clinometer is defined as Lb, a coordinate Yb in the third direction D3 and a coordinate Zb in the vertical direction at the position of the underground clinometer 44b on the basis of the origin are respectively represented by Formula (2) below.

[Formula 2]

$$Yb = Lb \cdot \sin(\varphi b) - La \cdot \sin(\varphi a)$$

$$Zb = -Lb \cdot \cos(\varphi b) + La \cdot \cos(\varphi a) \quad (2)$$

Date of a position of the plurality of underground clinometers is one example of data indicative of a position of the plurality of measuring parts in the excavating body 14 with respect to the reference part.

The excavation depth is a depth down to an excavation bottom on the basis of the origin. The designated position is a position in the second direction D2 (the lateral direction) designated by person's operation. Specifically, the designated position is represented by a distance from the origin in the second direction D2.

In Step S1, the data acquiring portion 5b which acquires data of the ground clinometer position, the plurality of underground clinometer positions, and the excavation depth is one example of a first acquisition portion in the present embodiment. Further in Step S1, the data acquiring portion 5b which acquires data of one or more designated positions is one example of a third acquisition portion of the present embodiment. Step S1 is one example of a first acquisition step and a third acquisition step in the present embodiment.

<Step S2>

Next in Step S2, the data acquiring portion 5b acquires detection data from the state detection device 4. The detection data includes data of the inclination angle detection value of the plurality of measuring parts, data of the travel distance detection value, and data of the lateral slide distance detection value.

Step S2 is one example of a second acquisition step in the present embodiment, in which data is acquired of the inclination angle detection value of the plurality of measuring parts output from the inclination angle detection device of the excavator for a trench 10. The data acquiring portion 5b which executes the processing of Step S2 is one example of a second acquisition portion in the present embodiment.

<Step S3>

Next, in Step S3, the measurement position deriving portion 5c determines whether a predetermined output execution condition is fulfilled or not. The measurement position deriving portion 5c causes the processing to proceed to Step S4 in a case where the output execution condition is fulfilled and otherwise, causes the processing to proceed to Step S2.

The output execution condition is a condition for determining whether processing of deriving and outputting a value related to a shape of the trench is to be executed or not. For example, the output execution condition includes a first execution condition that execution instructing operation determined in advance for the operation input device 61 has been conducted.

Also, the output execution condition may include a second execution condition that an excavation advancing distance, which is a distance of movement of the excavating body 14 from the origin to the second direction D2 while excavating the trench, reaches an integral multiple of a designated distance which is set in advance.

The measurement position deriving portion 5c accumulates the lateral slide distance detection values and further adds an accumulation value of the lateral slide distance detection values to the travel distance detection value, thereby deriving the excavation advancing distance.

<Step S4>

Next, in Step S4, the measurement position deriving portion 5c derives a plurality of measurement positions from the position of the reference part and the position of the plurality of measuring parts, and the inclination angle detection value. The plurality of measurement positions is a relative position of the plurality of measuring parts with respect to the origin, respectively.

Specifically, the measurement position deriving portion 5c derives the excavation advancing distance as a coordinate value in the second direction D2 of the plurality of measurement positions. Further, the measurement position deriving portion 5c derives a coordinate value in the third direction D3 and a coordinate value in the vertical direction at the plurality of measurement positions based on the above-described Formula (1) and Formula (2).

The measurement position deriving portion 5c which executes the processing of Step S4 is one example of a first deriving portion in the present embodiment. Also, Step S4 is one example of a first deriving step in the present embodiment.

<Step S5>

Next, in Step S5, the interpolation processing portion 5d derives an excavation position by interpolation processing executed based on the plurality of measurement positions derived in Step S4 and the excavation depth acquired in Step S1. The excavation position is a position of a part of the excavating body 14, the part intersecting a horizontal plane at the excavation depth. The horizontal plane at the excavation depth is a horizontal plane positioned below the ground surface (the origin) by the excavation depth.

For example, the interpolation processing portion 5d selects two adjacent measurement positions which are measurement positions located adjacent to each other in the vertical direction with respect to the excavation depth among the plurality of measurement positions derived in Step S4. Further, the interpolation processing portion 5d derives the excavation position by linear interpolation processing executed based on the two adjacent measurement positions and the excavation depth.

The interpolation processing portion 5d which executes the processing of Step S5 is one example of a second deriving portion in the present embodiment. Also, Step S5 is one example of a second deriving step in the present embodiment.

In Step S5, the interpolation processing portion 5d also derives a trench upper end position by the interpolation processing executed based on the plurality of measurement positions derived in Step S4. The trench upper end position is a position of a part of the excavating body 14 intersecting with the ground surface.

Figure 6:
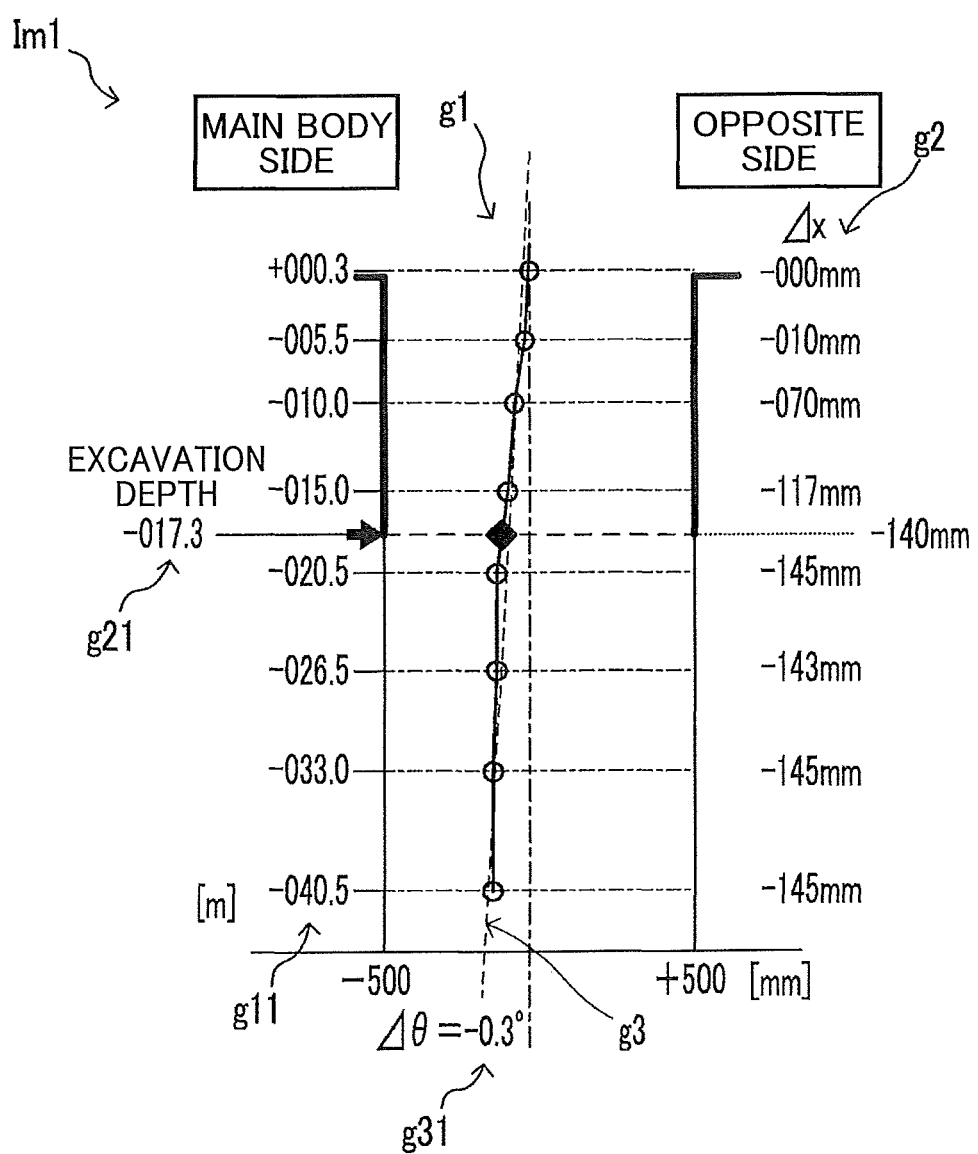
FIG. 6 is an output image of a first excavation result output by a data processing device in the excavator for a trench according to the first embodiment of the present invention.

FIG. 6 shows one example of an output image (a first distribution diagram g1) of a first excavation result output by the data processing device 5 in the excavator for a trench 10 according to the present embodiment. The first distribution diagram g1 is a distribution diagram showing the plurality of measurement positions and the excavation position at a certain position in the second direction D2 when viewed along the second direction D2. In other words, the first distribution diagram g1 is a distribution diagram showing coordinates, in the third direction D3, of the plurality of measurement positions and the excavation position at a certain position in the second direction D2.

In FIG. 6, a position of a plurality of white round marks represents one example of the plurality of measurement positions and a position of a black rhombic mark represents one example of the excavation position.

Figure 7:
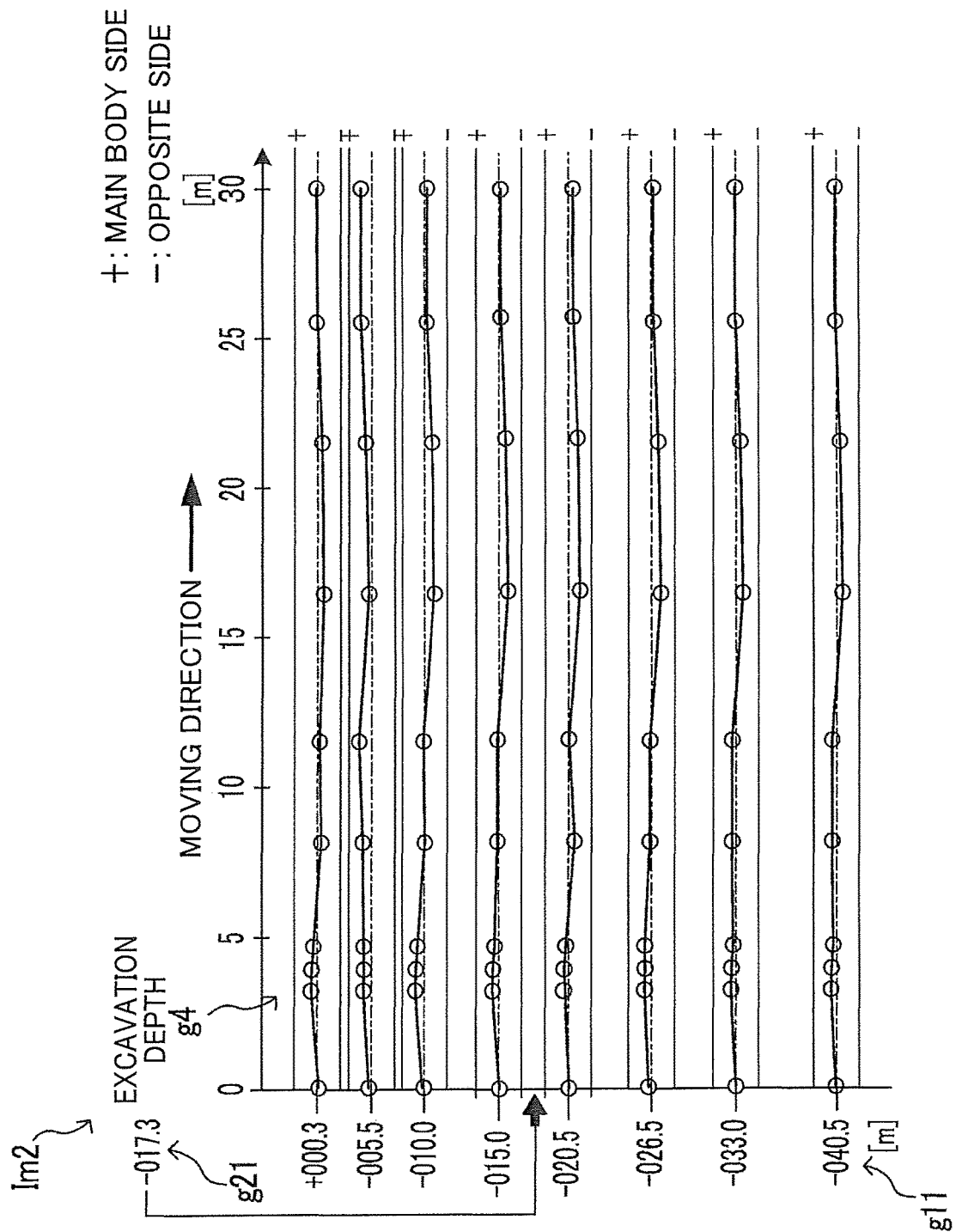
FIG. 7 is an output image of a second excavation result output by the data processing device in the excavator for a trench according to the first embodiment of the present invention.

FIG. 7 shows one example of an output image (a second distribution diagram g4) of a second excavation result output by the data processing device 5 in the excavator for a trench 10 according to the present embodiment. The second distribution diagram g4 is a distribution diagram showing the plurality of measurement positions at each depth of the measurement position viewed along the vertical direction. In other words, the second distribution diagram g4 is a distribution diagram showing coordinates, in the third direction D3, of the measurement position at each depth of the measurement position.

In FIG. 7, a position of a plurality of white round marks represents one example of the plurality of measurement positions.

Figure 8:
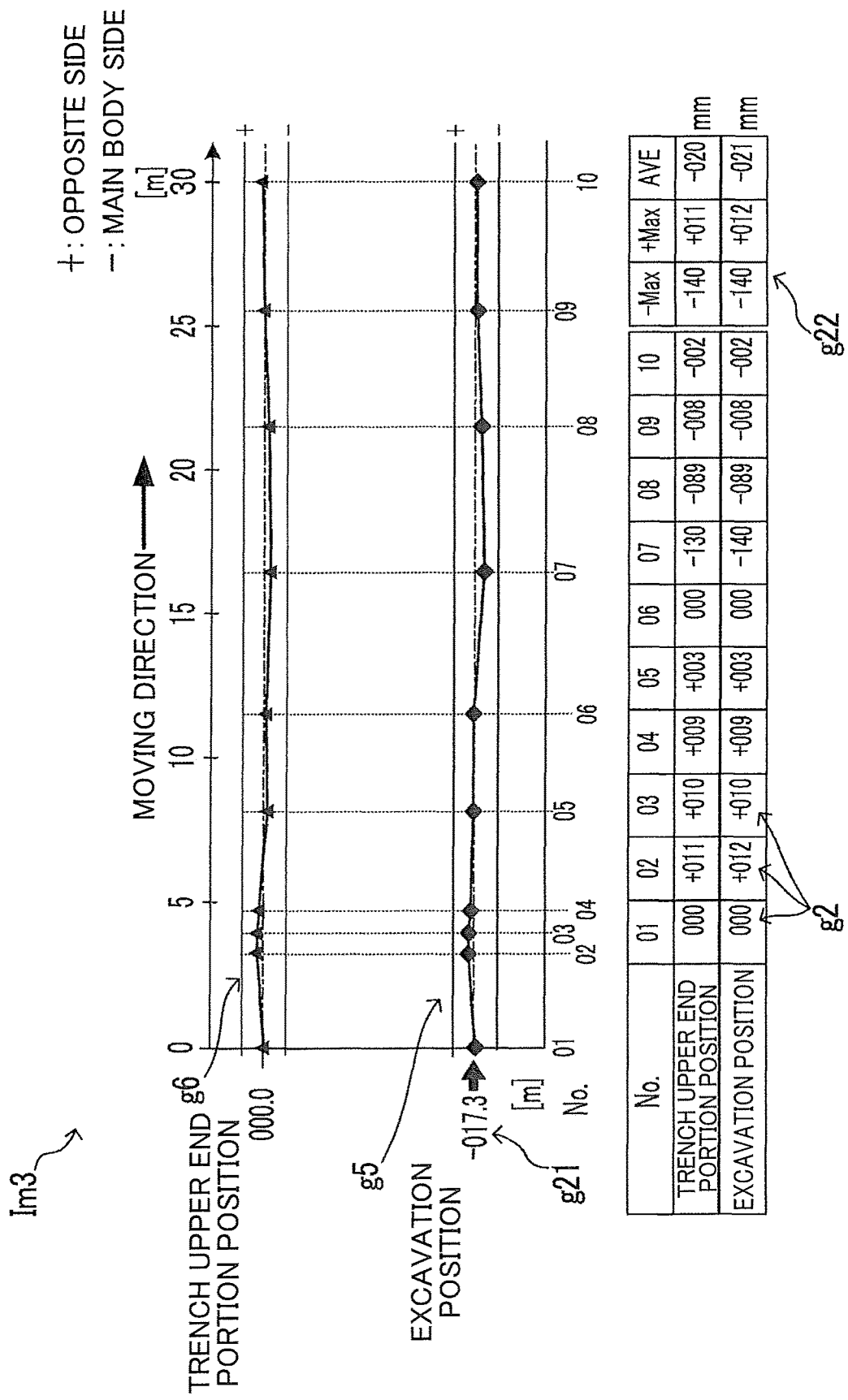
FIG. 8 is an output image of a third excavation result output by the data processing device in the excavator for a trench according to the first embodiment of the present invention.

FIG. 8 shows one example of an output image (a third distribution diagram g5 and a fourth distribution diagram g6) of a third excavation result output by the data processing device 5 in the excavator for a trench 10 according to the present embodiment. The third distribution diagram g5 is a distribution diagram showing a plurality of the excavation positions viewed along the vertical direction. In other words, the third distribution diagram g5 is a distribution diagram showing coordinates, in the third direction D3, of the plurality of excavation positions.

In FIG. 8, a position of a plurality of black rhombic marks represents one example of the plurality of excavation positions corresponding to a plurality of positions in the second direction D2.

The fourth distribution diagram g6 is a distribution diagram showing a plurality of the trench upper end positions viewed along the vertical direction. In other words, the fourth distribution diagram g6 is a distribution diagram showing coordinates, in the third direction D3, of the plurality of trench upper end positions.

In FIG. 8, a position of a plurality of black triangular marks represents one example of the plurality of trench upper end positions corresponding to the plurality of positions in the second direction D2.

<Step S6>

Next, in Step S6, the measurement position deriving portion 5c determines whether the excavating body 14 has passed through the designated position or not. Specifically, the measurement position deriving portion 5c determines that the excavating body 14 has passed through the designated position in a case where the excavation advancing distance exceeds a distance from the origin indicated by the designated position.

Then, when determining that the excavating body 14 has passed through the designated position, the measurement position deriving portion 5c causes the processing to proceed to Step S7 and otherwise, causes the processing to proceed to Step S8.

<Step S7>

Next, in Step S7, the interpolation processing portion 5d derives a designated excavation position by interpolation processing based on the plurality of excavation positions and the designated position. The designated excavation position is a position of a part of the excavating body 14, the part intersecting the horizontal plane at the excavation depth, when the excavating body 14 passes through the designated position.

Step S7 is one example of a third deriving step of deriving the designated excavation position in the present embodiment. The interpolation processing portion 5d which executes the processing of Step S7 is one example of a third deriving portion in the present embodiment.

For example, the interpolation processing portion 5d selects two adjacent excavation positions which are excavation positions located adjacent to each other in the second direction D2 with the designated position provided therebetween among the plurality of excavation positions derived in Step S5. Further, the interpolation processing portion 5d derives the designated excavation position by linear interpolation processing based on the two adjacent excavation positions and the designated position.

In Step S7, the interpolation processing portion 5d also derives a designated trench upper end position by interpolation processing based on the trench upper end position derived in Step S5. The designated trench upper end position is a position of a part of the excavating body 14 intersecting with the ground surface when the excavating body 14 passes through the designated position.

Figure 9:
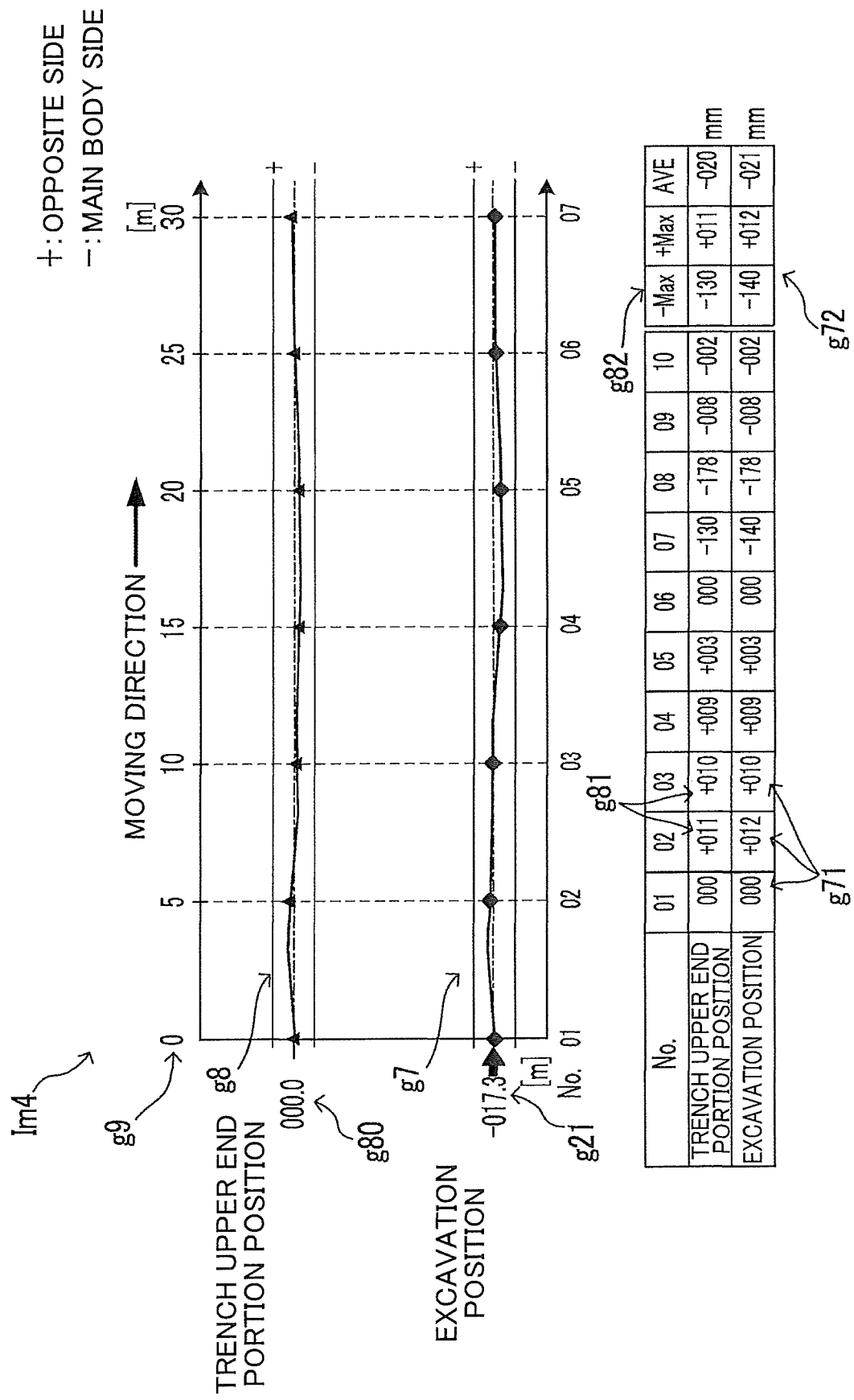
FIG. 9 is an output image of a fourth excavation result output by the data processing device in the excavator for a trench according to the first embodiment of the present invention.

FIG. 9 shows one example of an output image (a fifth distribution diagram g7 and a sixth distribution diagram g8) of a fourth excavation result output by the data processing device 5 in the excavator for a trench 10 according to the present embodiment. The fifth distribution diagram g7 is a distribution diagram showing a plurality of the designated excavation positions viewed along the vertical direction. In other words, the fifth distribution diagram g7 is a distribution diagram showing coordinates, in the third direction D3, of the plurality of designated excavation positions.

In FIG. 9, a position of a plurality of black rhombic marks represents one example of the plurality of designated excavation positions corresponding to a plurality of positions in the second direction D2.

The sixth distribution diagram g8 is a distribution diagram showing a plurality of designated trench upper end positions viewed along the vertical direction. In other words, the sixth distribution diagram g8 is a distribution diagram showing coordinates, in the third direction D3, of the plurality of designated trench upper end positions.

In FIG. 9, a position of a plurality of black triangular marks represents one example of the plurality of designated trench upper end positions corresponding to a plurality of the designated positions.

Each of the coordinate values of the measurement position, the excavation position, the trench upper end portion position, the designated excavation position, and the designated trench upper end portion position derived in Steps S4, S5, and S7 is one example of a value (information) related to a shape of the trench.

<Step S8>

Next, in Step S8, the gap deriving portion 5e derives an approximate straight line g3 for the plurality of measurement positions derived in Step S4 (see FIG. 6). For example, the gap deriving portion 5e derives the approximate straight line g3 by the least squares method.

<Step S9>

Further, in Step S9, the gap deriving portion 5e derives various kinds of gap amounts. In the present embodiment, the gap amount includes a plurality of positional deviation amounts $\Delta x$ and gap angles $\Delta \theta$ corresponding to the plurality of measurement positions, the excavation position, and the trench upper end portion position (see FIG. 6).

The gap angle $\Delta \theta$ is an angle formed with the first direction D1 by the approximate straight line g3.

The positional deviation amount $\Delta x$ is a difference of the measurement position or the excavation position from a target position of the measurement position or the excavation position in the third direction D3. As described above, the measurement position is derived in Step S4 and the excavation position is derived in Step S5. The positional deviation amount $\Delta x$ corresponding to the excavation position is one example of information about the excavation position.

A target position of the trench upper end portion position is a position of a reference point away from the origin in the second direction D2 by the excavation advancing distance.

A target position of each measurement position is a position of an intersection between a straight line along the first direction D1 and passing through the reference point and a horizontal plane at a depth of each measurement position. In a case where the first direction D1 is the vertically downward direction, the positional deviation amount $\Delta x$ corresponding to each measurement position is equal to a coordinate value of each measurement position in the third direction D3.

A target position of the excavation position is a position of an intersection between the straight line along the first direction D1 and passing through the reference point and the horizontal plane at the excavation depth. In a case where the first direction D1 is the vertically downward direction, the positional deviation amount $\Delta x$ corresponding to the excavation position is equal to a coordinate value of the excavation position in the third direction D3

The gap deriving portion Se similarly derives positional deviation amounts $\Delta x$ corresponding to the designated excavation position and the designated trench upper end position in Step S9.

<Step S10>

Next, in Step S10, the output portion 5f records excavation data DT2 including at least data of the plurality of measurement positions derived in Step S4 in the storage device 64.

The output portion 5f may also record the excavation data DT2 after including, in the excavation data DT2, the data of the excavation position derived in Step S5. In this case, Step S10 is one example of an output step, in the present embodiment, of outputting the information about the excavation position to the storage device 64.

The output portion 5f may also record the excavation data DT2 after including, in the excavation data DT2, one or both of the data of the designated excavation position derived in Step S7 and the data of the gap derived in Step S9.

<Step S11>

Further, in Step S11, the output portion 5f inputs, to the display device 62, an excavation monitoring screen including a part or all of information about positions derived in Steps S4, S5, and S7, information about the approximate straight line g3 derived in Step S9 or information about the gap amount derived in Step S10.

For example, the output portion 5f inputs, to the display device 62, the excavation monitoring screen including one or a plurality of a first excavation result output image Im1 shown in FIG. 6, a second excavation result output image Im2 shown in FIG. 7, a third excavation result output image Im3 shown in FIG. 8, and a fourth excavation result output image Im4 shown in FIG. 9.

In the example shown in FIG. 6, the first excavation result output image Im1 includes the above-described first distribution diagram g1, numerical value data g11 of a depth of the plurality of measurement positions corresponding to the first distribution diagram g1, numerical value data g2 of the plurality of positional deviation amounts $\Delta x$ corresponding to the plurality of measurement positions and the excavation position, an image of the approximate straight line g3, and numerical value data g31 of the gap angle $\Delta \theta$.

It is in general desirable to have a small positional deviation amount $\Delta x$ and a small gap angle $\Delta \theta$ corresponding to the excavation position when excavating the trench. Accordingly, by quickly presenting, to an operator of the excavator for a trench 10, the positional deviation amount $\Delta x$ and the gap angle $\Delta \theta$ corresponding to the excavation position when the trench is being excavated, the operator can operate the excavator for a trench 10 more appropriately. As a result, the wall can be created with higher precision in shape.

In the example shown in FIG. 7, the second excavation result output image Im2 includes the second distribution diagram g4 showing each depth of the plurality of measurement positions, the numerical value data g11 of a depth of the plurality of measurement positions corresponding to the second distribution diagram g4, and numerical value data g21 of the excavation depth.

In the example shown in FIG. 8, the third excavation result output image Im3 includes the above-described third distribution diagram g5 and fourth distribution diagram g6, and the numerical value data g2 of the plurality of positional deviation amounts Δx corresponding to a plurality of the trench upper end portion positions and the plurality of excavation positions.

The third excavation result output image Im3 further includes numerical value data g22 of a representative value of the plurality of positional deviation amounts Δx corresponding to the plurality of trench upper end portion positions and the plurality of excavation positions. For example, the representative value is a maximum value of the positional deviation amount Δx to the main body portion 11 side in the third direction D3, a maximum value of the positional deviation amount Δx to a side oppopart to the main body portion 11 in the third direction D3, or an average value of the positional deviation amount Δx.

In general, the excavation position and the trench upper end portion position are essential management parameters when excavating the trench. Accordingly, by quickly presenting, to the operator, one or both of the third distribution diagram g5 and the fourth distribution diagram g6 when the trench is being excavated, the operator can operate the excavator for a trench 10 more appropriately. As a result, the wall can be created with higher precision in shape.

In the example shown in FIG. 9, the fourth excavation result output image Im4 includes the above-described fifth distribution diagram g7 and sixth distribution diagram g8, numerical value data g9 of the designated positions corresponding to the fifth distribution diagram g7 and the sixth distribution diagram g8, numerical value data g71 of the plurality of positional deviation amounts Δx corresponding to the plurality of designated excavation positions, and numerical value data g81 of the plurality of positional deviation amounts Δx corresponding to a plurality of the designated trench upper end portion positions.

Further, the fourth excavation result output image Im4 also includes numerical value data g72 of a representative value of the plurality of positional deviation amounts Δx corresponding to the plurality of designated excavation positions, and numerical value data g82 of a representative value of the plurality of positional deviation amounts Δx corresponding to the plurality of designated trench upper end portion positions.

By quickly presenting, to the operator, one or both of the fifth distribution diagram g7 and the sixth distribution diagram g8 when the trench is being excavated, the same effect can be obtained as in a case where the third distribution diagram g5 or the fourth distribution diagram g6 is presented.

Step S11 is one example of an output step of outputting (inputting) information about the excavation position to the display device 62 in the present embodiment.

<Step S12>

Next, in Step S12, a main control portion 8a determines whether a predetermined end condition is fulfilled or not. For example, the end condition is fulfilled in a case where predetermined end operation is conducted with respect to the operation input device 61.

Then, when determining that the end condition is fulfilled, the main control portion 8a causes the processing to proceed to Step S13 and otherwise, causes the processing to proceed to Step S2. As a result, the processing of Steps S2 to S11 will be executed a plurality of times corresponding to a plurality of positions of the excavating body 14 in the second direction D2 until the end condition is fulfilled.

<Step S13>

In Step S13, the output portion 5f transmits the excavation data DT2 accumulated in the storage device 64 to the management device through the radio communication device 65. Thereafter, the output portion 5f causes the excavation data processing to end.

As described in the foregoing, in a case where the trench is excavated by the TRD, the data processing device 5 can derive the excavation position and the designated excavation position which show a shape of the trench at the position of the depth of the excavation bottom irrespective of a position of the measuring part at which an inclination angle is detected in the excavating body 14.

As described in the foregoing, the excavation data processing method according to the present embodiment, in which while excavating a trench underground by moving, in a lateral direction, the excavating body 14 being partly buried underground, the excavator for a trench 10 forms a wall underground corresponding to the trench, is an excavation data processing method including: acquiring data output from the excavator for a trench 10; and deriving an information value related to a shape of the trench in order to excavate a part adjacent to one wall surface of the wall extending in the lateral direction, down to a predetermined excavation bottom positioned between an upper end portion and a lower end portion of the wall.

The excavation data processing method has the first acquisition step, the second acquisition step, the first deriving step, the second deriving step, and the output step.

The first acquisition step acquires reference part position data as data related to a relative position of a reference part of the excavating body 14 with respect to the origin on the ground surface, the reference part being arranged above the ground; data of a plurality of measuring part positions as data related to a relative position of each of the plurality of measuring parts in the excavating body 14 with respect to the reference part, the plurality of measuring parts being arranged underground at a space from each other in the up-down direction; and data indicative of an excavation depth as a depth from the ground surface to the excavation bottom underground.

The second acquisition step acquires data of a plurality of inclination angles as data of an inclination angle of each of the plurality of measuring parts with respect to the vertical direction, the data being output from the excavator for a trench 10.

The first deriving step derives a plurality of measurement positions as relative positions of the plurality of measuring parts with respect to the origin from the reference part position data and the plurality of measuring part positions data acquired in the first acquisition step and the plurality of inclination angles data acquired in the second acquisition step.

The second deriving step derives an excavation position (excavation bottom position) as a relative position of a part of the excavating body with respect to the origin, the part intersecting a horizontal plane below the ground surface by the excavation depth, by interpolation processing based on the plurality of measurement positions derived in the first deriving step and the excavation depth acquired in the first acquisition step.

In the output step, information of the excavation position is output.

Also in the present embodiment, the output step includes a step of outputting a distribution diagram showing a part or all of the plurality of measurement positions and the excavation position viewed along the lateral direction.

Further, in the present embodiment, the excavation data processing method further includes a step of acquiring data indicative of a moving distance of the excavating body 14 in the lateral direction from the origin, the data being output from the excavator for a trench 10. Then, the second acquisition step, the first deriving step, and the second deriving step are executed corresponding to a plurality of positions of the excavating body 14 in the lateral direction.

Further, in the present embodiment, the output step includes a step of outputting a distribution diagram of the plurality of excavation positions viewed along the vertical direction.

Further, in the present embodiment, the excavation data processing method further includes the third acquisition step and the third deriving step. In the third acquisition step, data indicative of one or more designated positions as positions in the lateral direction is acquired.

Also, the third deriving step derives a designated excavation position (designated excavation bottom position) as a position of a part of the excavating body 14, the part intersecting a horizontal plane below the ground surface by the excavation depth when the excavating body 14 passes through the designated position by interpolation processing based on the plurality of excavation positions and the designated position.

Next, a data processing device according to a second embodiment of the present invention will be described. The data processing device in the present embodiment is a calculator or the like not mounted on the excavator for a trench 10. In the following description, the data processing device according to the present embodiment will be referred to as an external data processing device. The external data processing device is one example of an excavation data processing device in the present embodiment.

The external data processing device acquires the detection data output from the excavator for a trench 10 in Step S2 of FIG. 5 through a non-volatile storage medium or a communication network.

For example, the data processing device 5 of the excavator for a trench 10 records the detection data corresponding to a plurality of positions in the second direction D2 in a portable storage device such as a USB memory, and the external data processing device acquires the detection data from the portable storage device.

Alternatively, in Step S13 of FIG. 5, the data processing device 5 of the excavator for a trench 10 transmits, to the management device, the detection data corresponding to a plurality of positions in the second direction D2, and the external data processing device acquires the detection data from the management device through a communication network.

Then, the external data processing device executes the processing of Steps S1 to S5 and Steps S7 to S11 shown in FIG. 5 so as to correspond to the detection data corresponding to a plurality of positions in the second direction D2.

Meanwhile, in Step S10 of FIG. 5, the external data processing device outputs, to a printer, information indicative of the excavation data DT2 as a table of numerical value data or as the diagrams shown in FIGS. 6 to 9. As a result, the information indicative of the excavation data DT2 is output as a printed matter of the table of numerical value data or the diagrams shown in FIGS. 6 to 9.

Step S10 in the present embodiment is one example of the output step in which information about the excavation position is output onto paper through the printer.

Applied Example

In the data processing device 5 or the external data processing device, the measurement position deriving portion 5c and the interpolation processing portion 5d may derive a position of one end or both ends of the cutter post 141 in a thickness direction based on the wall thickness as the measurement position, the excavation position, the trench upper end portion position, the designated excavation position, or the designated trench upper end portion position.

The present invention provides an excavation data processing method. The excavation data processing method is for acquiring data output from an excavator for a trench that, while excavating a trench underground by moving, in a lateral direction, an excavating body being partly buried underground, forms a wall underground corresponding to the trench, the excavating body having a vertically long post portion extending in an up-down direction and having an endless excavating chain supported by the post portion so as to surround the post portion in the up-down direction and the lateral direction and rotating along a periphery of the post portion, and for deriving information related to a shape of the trench in order to excavate a part adjacent to one wall surface of the wall extending in the lateral direction, down to a predetermined excavation bottom positioned between an upper end portion and a lower end portion of the wall.

The excavation data processing method includes: a first acquisition step of acquiring reference part position data as data related to a relative position of a reference part of the excavating body with respect to an origin on the ground surface, the reference part being arranged above the ground; data of a plurality of measuring part positions as data related to a relative position of each of a plurality of measuring parts in the excavating body with respect to the reference part, the plurality of measuring parts being arranged underground at a space from each other in the up-down direction; and data indicative of an excavation depth as a depth from the ground surface to the excavation bottom underground; a second acquisition step of acquiring data of a plurality of inclination angles as data of an inclination angle of each of the plurality of measuring parts with respect to a vertical direction, the data being output from the excavator for a trench; a first deriving step of deriving a plurality of measurement positions as relative positions of the plurality of measuring parts with respect to the origin from the reference part position data and the plurality of measuring part positions data acquired in the first acquisition step and the plurality of inclination angles data acquired in the second acquisition step; a second deriving step of deriving an excavation bottom position as a relative position of a part of the excavating body with respect to the origin, the part intersecting a horizontal plane below the ground surface by the excavation depth, by interpolation processing based on the plurality of measurement positions derived in the first deriving step and the excavation depth acquired in the first acquisition step; and an output step of outputting information of the excavation bottom position.

According to the present method, an excavation bottom position indicative of a shape of a trench at a position of a depth of the excavation bottom in the trench can be derived and output irrespective of a position of a measuring part of an excavating body where an inclination angle is detected. Therefore, when a building is constructed adjacent to a wall formed by the excavator for a trench, the position of the excavation bottom where a foundation part of the building is formed can be precisely grasped based on the information output in the output step.

In the above method, the output step preferably includes a step of outputting a distribution diagram showing a part or all of the plurality of measurement positions and the excavation bottom position viewed along the lateral direction.

According to the present method, a relative positional relationship between a plurality of measurement positions and an excavation bottom position viewed from the lateral direction can be visually grasped from the distribution diagram output in the output step. It is therefore possible to grasp shapes of an excavation bottom and a trench (wall) on the periphery thereof with ease.

The above method preferably further includes a step of acquiring data indicative of a moving distance of the excavating body in the lateral direction from the origin, the data being output from the excavator for a trench, in which the second acquisition step, the first deriving step, and the second deriving step are executed corresponding to a plurality of positions of the excavating body in the lateral direction.

According to the present method, it is possible to grasp a change of an excavation bottom position along the lateral direction.

In the above method, the output step preferably includes a step of outputting a distribution diagram of a plurality of the excavation bottom positions viewed along the vertical direction.

According to the present method, it is possible to visually grasp a change of an excavation bottom position along the lateral direction from the distribution diagram output in the output step.

The above method preferably further includes: a third acquisition step of acquiring data indicative of one or more designated positions as positions in the lateral direction; and a third deriving step of deriving a designated excavation bottom position as a position of a part of the excavating body, the part intersecting a horizontal plane below the ground surface by the excavation depth when the excavating body passes through the designated position by interpolation processing based on the plurality of excavation bottom positions and the designated position.

According to the present method, it is possible to grasp a designated excavation bottom position corresponding to a designated position in the lateral direction.

The present invention also provides an excavation data processing device. The excavation data processing device acquires data output from an excavator for a trench that, while excavating a trench underground by moving, in a lateral direction, an excavating body being partly buried underground, forms a wall underground corresponding to the trench, the excavating body having a vertically long post portion extending in an up-down direction and having an endless excavating chain supported by the post portion so as to surround the post portion in the up-down direction and the lateral direction and rotating along a periphery of the post portion, and derives information related to a shape of the trench in order to excavate a part adjacent to one wall surface of the wall extending in the lateral direction, down to a predetermined excavation bottom positioned between an upper end portion and a lower end portion of the wall. The excavation data processing device includes: a first acquisition portion which acquires reference part position data as data related to a relative position of a reference part of the excavating body with respect to an origin on the ground surface, the reference part being arranged above the ground; data of a plurality of measuring part positions as data related to a relative position of each of a plurality of measuring parts in the excavating body with respect to the reference part, the plurality of measuring parts being arranged underground at a space from each other in the up-down direction; and data indicative of an excavation depth as a depth from the ground surface to the excavation bottom underground; a second acquisition portion which acquires data of a plurality of inclination angles as data of an inclination angle of each of the plurality of measuring parts with respect to a vertical direction, the data being output from the excavator for a trench; a first deriving portion which derives a plurality of measurement positions as relative positions of the plurality of measuring parts with respect to the origin from the reference part position data and the plurality of measuring part positions data acquired by the first acquisition portion and the plurality of inclination angles data acquired by the second acquisition portion; a second deriving portion which derives an excavation bottom position as a relative position of a part of the excavating body with respect to the origin, the part intersecting a horizontal plane below the ground surface by the excavation depth, by interpolation processing based on the plurality of measurement positions derived by the first deriving portion and the excavation depth acquired by the first acquisition portion; and an output portion which outputs information of the excavation bottom position.

According to the present configuration, an excavation bottom position (excavation position) indicative of a shape of a trench at a position of a depth of the excavation bottom in the trench can be derived and output irrespective of a position of a measuring part in the excavating body where an inclination angle is detected. Therefore, when a building is constructed adjacent to a wall formed by the excavator for a trench, the position of the excavation bottom where a foundation part of the building is formed can be precisely grasped based on the information output in the output step.

The present invention further provides an excavator for a trench. The excavator for a trench includes: an excavating body having a vertically long post portion extending in an up-down direction and having an endless excavating chain supported by the post portion so as to surround the post portion in the up-down direction and a lateral direction and rotating along a periphery of the post portion; an inclination angle detection device which detects and outputs an inclination angle, formed with respect to the vertical direction, of each of a plurality of measuring parts arranged at a space from each other in the up-down direction in the excavating body; and the above-described excavation data processing device. While moving in the lateral direction to excavate a trench underground, the excavating body being partly buried underground forms a wall underground corresponding to the trench, and the excavation data processing device acquires data of the plurality of inclination angle detection values from the inclination angle detection device to derive information related to a shape of the trench.

According to the present configuration, when a wall is formed underground by the excavator for a trench and a building or the like is constructed adjacent to the wall, the position of the excavation bottom where a foundation part of the building is formed can be precisely grasped.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An excavator for a trench comprising:
an excavating body having a vertically long post portion extending in an up-down direction and having an endless excavating chain supported by the post portion so as to surround the post portion in the up-down direction and a lateral direction and rotating along a periphery of the post portion;
an inclination angle detection device which includes at least one sensor that detects and outputs an inclination angle, formed with respect to a vertical direction, of each of a plurality of measuring parts arranged at a space from each other in the up-down direction in the excavating body; and
an excavation data processing device,
wherein the excavation data processing device includes:
processing circuitry configured to
acquire data output from an excavator for a trench that, while excavating a trench underground by moving, in a lateral direction, an excavating body being partly buried underground, forms a wall underground corresponding to the trench, the excavating body having a vertically long post portion extending in an up-down direction and having an endless excavating chain supported by the post portion so as to surround the post portion in the up-down direction and the lateral direction and rotating along a periphery of the post portion, and derives information related to a shape of the trench in order to excavate a part adjacent to one wall surface of the wall extending in the lateral direction, down to a predetermined excavation bottom positioned between an upper end portion and a lower end portion of the wall,
implement a first acquisition portion which acquires reference part position data as data related to a relative position of a reference part of the excavating body with respect to an origin on a ground surface, the reference part being arranged above the ground; data of a plurality of measuring part positions as data related to a relative position of each of a plurality of measuring parts in the excavating body with respect to the reference part, the plurality of measuring parts being arranged underground at a space from each other in the up-down direction; and data indicative of an excavation depth as a depth from the ground surface to the excavation bottom underground;
implement a second acquisition portion which acquires data of a plurality of inclination angles as data of an inclination angle of each of the plurality of measuring parts with respect to a vertical direction, the data being output from the excavator for a trench;
implement a first deriving portion which derives a plurality of measurement positions as relative positions of the plurality of measuring parts with respect to the origin from the reference part position data and the plurality of measuring part positions data acquired by the first acquisition portion and the plurality of inclination angles data acquired by the second acquisition portion;
implement a second deriving portion which derives an excavation bottom position as a relative position of a part of the excavating body with respect to the origin, the part intersecting a horizontal plane below the ground surface by the excavation depth, by interpolation processing based on the plurality of measurement positions derived by the first deriving portion and the excavation depth acquired by the first acquisition portion; and
implement an output portion which outputs information of the excavation bottom position,
wherein the processing circuitry is further configured to acquire data indicative of a moving distance of the excavating body in the lateral direction from the origin, the data being output from the excavator for a trench, wherein
processing by the second acquisition portion, the first deriving portion and the second deriving portion are executed corresponding to a plurality of positions of the excavating body in the lateral direction, and
wherein the output portion outputs a distribution diagram showing a part or all of the plurality of measurement positions and the excavation bottom position viewed along the vertical direction,
wherein
while moving in the lateral direction to excavate a trench underground, the excavating body being partly buried underground forms a wall underground corresponding to the trench, and
the excavation data processing device acquires data of the plurality of inclination angle detection values from the inclination angle detection device to derive information related to a shape of the trench.

* * * * *